United States Patent
Bergenwall et al.

(10) Patent No.: US 6,463,082 B2
(45) Date of Patent: Oct. 8, 2002

(54) PACKET TRANSMISSION METHOD AND APPARATUS

(75) Inventors: Martin Bergenwall; Yrjo Raivio, both of Espoo (FI)

(73) Assignee: Nokia Networks Oy, Espoo (FI)

(*) Notice: Subject to any disclaimer, the term of this patent is extended or adjusted under 35 U.S.C. 154(b) by 0 days.

(21) Appl. No.: 09/847,814

(22) Filed: May 2, 2001

(65) Prior Publication Data

US 2002/0126710 A1 Sep. 12, 2002

Related U.S. Application Data

(63) Continuation of application No. PCT/EP98/08062, filed on Dec. 10, 1998.

(51) Int. Cl.[7] .................................................. H04J 3/04
(52) U.S. Cl. ........................ 370/535; 370/537; 370/471
(58) Field of Search ................................ 370/535–539, 370/471–477, 321, 236, 347, 337, 381, 395–397, 468, 444, 916, 260; 711/171–175, 153

(56) References Cited

U.S. PATENT DOCUMENTS

| | | | | |
|---|---|---|---|---|
| 5,014,265 A | * | 5/1991 | Hahne et al. ............... | 370/236 |
| 5,214,642 A | * | 5/1993 | Kunimoto et al. .......... | 370/471 |
| 5,251,209 A | | 10/1993 | Jurkevich et al. | |
| 5,761,197 A | | 6/1998 | Takefman | |
| 5,936,967 A | * | 8/1999 | Baldwin et al. ............. | 370/474 |
| 6,088,777 A | * | 7/2000 | Sober ........................... | 711/171 |
| 6,097,707 A | * | 8/2000 | Hodzic et al. ............... | 370/321 |
| 6,233,251 B1 | * | 5/2001 | Kurobe et al. .............. | 370/471 |

OTHER PUBLICATIONS

"Bundling Short Packets In An ATM Or Packet Network", IBM Technical Disclosure Bulletin, vol. 34, No. 4B, Sep. 1, 1998, pp. 360–362.
International Search Report for PCT/EP98/08062.

* cited by examiner

*Primary Examiner*—Kwang Bin Yao
*Assistant Examiner*—Prenell Jones
(74) *Attorney, Agent, or Firm*—Altera Law Group, LLC

(57) ABSTRACT

A packet transmission method and apparatus, according to which short data samples or mini packets from several simultaneous connections are multiplexed to a variable length packet. The length of the mini packets is defined in a common length field for mini packets of the same length, which saves bandwidth. Each mini packet has its own header, which defines at least an identification information of the mini packet. Thus, the variable length packet, e.g. an IP packet, includes a plurality of mini packets with a minimum header portion, such that transmission overhead is reduced due to the fact that most mini packets tend to be of the same length. Moreover, different queues for mini packets of one respective length may be provided, from which mini packets of one length are multiplexed to the variable length data packet. Thereby, the ratio of variable length data packets including mini packets of one length is further increased so as to further decrease the transmission overhead.

20 Claims, 3 Drawing Sheets

PACKET TRANSMISSION METHOD AND APPARATUS

This application is a continuation of PCT/EP 98/08062 filed on Dec. 10, 1998.

FIELD OF THE INVENTION

The present invention relates to a method and apparatus for transmitting data packets via a communication network such as an IP (Internet Protocol) network.

BACKGROUND OF THE INVENTION

At present, the IP has a strong position in the field of data telecommunication. The IP will also have a great impact on third generation mobile networks, since IP applications will be available for mobile users. Third generation mobile telecommunication systems aim at providing end-users, apart from terminal and personal mobility, with enhanced services. Compared to second generation systems, enhancements that will cover features all the way between the end-users and the core network elements are required, i.e. from mobile terminals to radio access and fixed networks.

The existing GSM network is optimal for circuit-switched voice calls and therefore inefficient at setting up and carrying very short data bursts. Packet switching is more efficient at carrying bursty data, and mobile networks will employ packet switching right up to the end terminal if they are to cope with the expected demand for future data services. A packet-switched mobile network opens the way for a range of new applications. IP interconnectivity and point-to-multipoint (PTM) transfers become reality with GPRS (General Packet Radio Service), wherein applications currently restricted to fixed line connections will migrate to the mobile world.

However, at present, IP does not support efficiently the transport of short data packets like cellular speech samples. Short speech packets are something that is very common in mobile networks and an efficient transmission scheme is needed in the mobile backbone network where thousands of connections are transmitted between different nodes.

As an example, the IP version 6 header consists of 40 bytes and a User Datagram Protocol (UDP) adds further 8 bytes to the header info. Thus, if a speech sample consisting of only 10 bytes is transmitted using such an IP data packet, the overhead of the IP layer is enormous.

SUMMARY OF THE INVENTION

It is therefore an object of the present invention to provide a packet transmission method and apparatus, by means of which the transmission overhead can be reduced when short data packets are transmitted.

This object is achieved by a method for transmitting data packets via a communication network, comprising the steps of:

multiplexing a plurality of data packets of several connections to a variable length data packet;

providing each of the plurality of data packets with a header portion defining at least an identification information of the respective data packet; and providing the variable length data packet with an information field indicating a common length of the plurality of data packets.

Additionally, the above object is achieved by an apparatus for transmitting data packets via a communication network, comprising:

multiplexing means for multiplexing a plurality of the data packets of several connections to a variable length data packet;

header generating means for adding a header portion to each of the plurality of data packets, the header portion defining at least an identification information of the respective data packet; and providing means for providing the variable length data packet with an information field indicating a common length of the plurality of data packets.

Accordingly, since a plurality of data packets are multiplexed to a variable length data packet comprising an information field which indicates a common length of the plurality of data packets, the header portions of the data packets can be kept as small as possible, i.e. defining at least an identification information of the respective data packet. Thereby, a length information in the header portions of the data packets is not required if the data packets included in the variable length data packet have the same length, which is often the case, such that the overall overhead ratio can be decreased.

Thus, small speech data packets can be transmitted with a small overhead via an IP network.

Furthermore, different queues may be formed, each comprising data packets of one length, wherein the data packets of one of the queues are multiplexed to the variable length data packet.

Hence, by queuing data packets of one length in corresponding queues, the variable length data packets can be multiplexed by using data packets of one queue, such that variable length data packets comprising data packets of one length can be generated as long as enough packets are included in one of these queues. Thus, transmission efficiency and overhead can be further reduced, since data packets of one variable length data packet are available in the queues and the length of the variable length data packet can be optimized to the length corresponding to the respective queue.

Preferably, the queues are filled up until a predetermined maximum size has been reached or until the expiry of a predetermined delay time, before their data packets are multiplexed. Thereby, a reasonable maximum packet delay can be secured.

The header portions of the data packets may comprise a length field indicating the length of the respective data packet, in case data packets of different lengths are included in the variable length data packet.

Moreover, the header portion of the data packets may also define a sequence number of said data packet. Thereby, the respective data packets are not mixed up at a receiver of the variable length data packets.

An information field of the variable length data packets may define a common type of the data packets, said common type indicating the length of said data packets. Thus, the length of the data packets does not have to be explicitly defined in the information field, in case the type of the data packets unambiguously defines the length of the data packets.

Preferably, a predetermined value of the information field of the variable length data packet can be used to indicate that said data packets included in the variable length data packet have different lengths. Thus, the receiver may easily gather from the information field whether the received variable length data packet comprises data packets of one length or data packets of different lengths. The predetermined value can be 0, for example.

Furthermore, a predetermined value of the length field of the header portion of the data packets can be used to indicate that the data packet is the last data packet in the variable length data packet. Thereby, one large data packet can be multiplexed as the last data packet in the variable length data packet. The predetermined value of the length field may be 0, for example.

Preferably, speech data packets received from a cellular communication network may be used as the data packets, wherein the communication network may be an IP network. Thereby, transmission of speech and data can be harmonized in the IP network.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

In the following, the preferred embodiment of the packet transmission method and apparatus according to the present invention will be described.

According to the preferred embodiment, short data packets (mini packets) like cellular speech samples from a cellular communication network are multiplexed, wherein one variable length IP/UDP packet of an IP network is used as a splitting platform.

Thus, short data samples from several simultaneous connections are multiplexed to the same IP/UDP frame (IP packet). The structure of the IP packet is such that each mini packet has its own mini header which defines at least an identification information such as a connection identifier (CID) of the mini packet.

Figure 1:
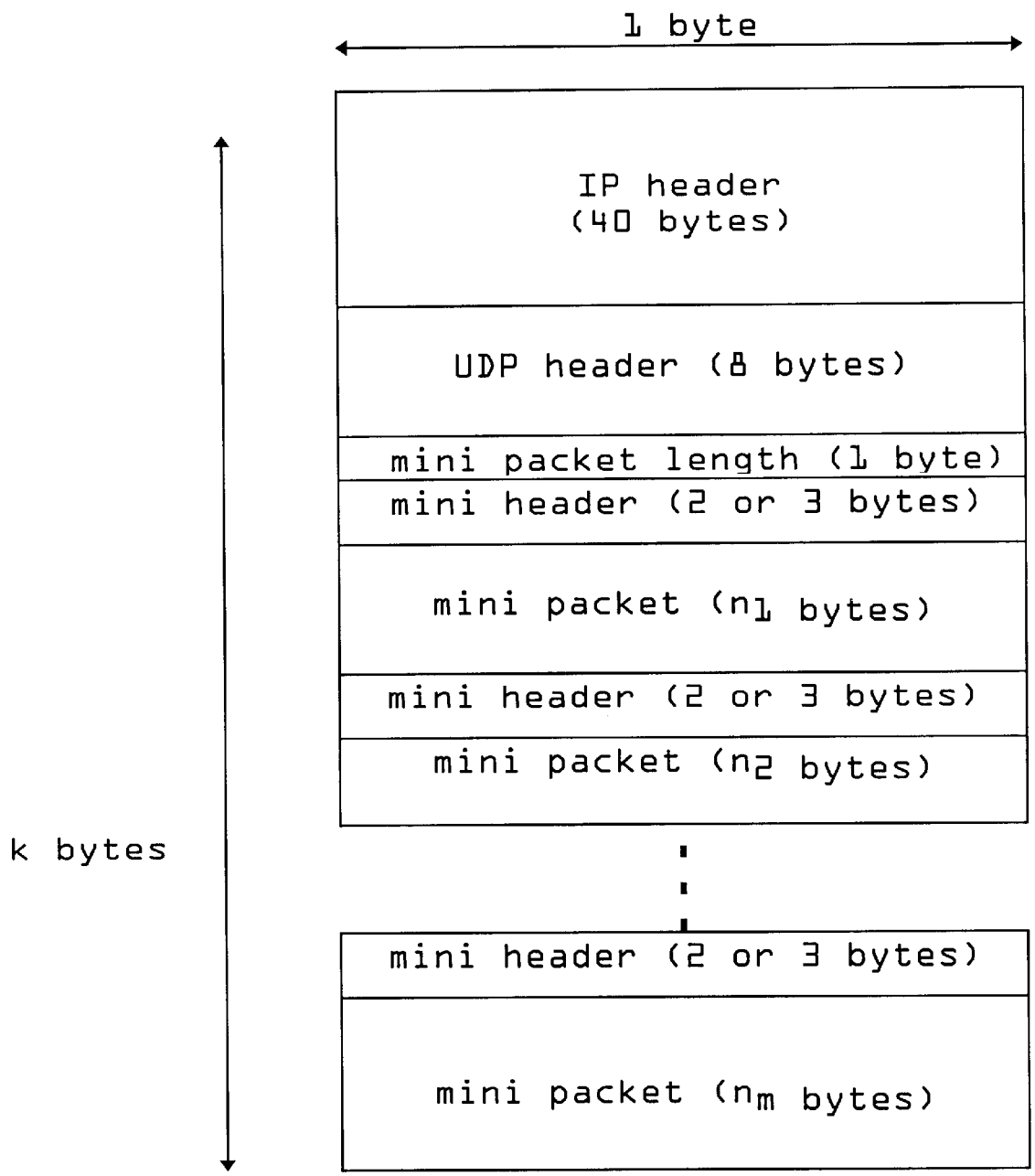
FIG. 1 shows a principle diagram of an IP data packet used for multiplexing mini data packets.

FIG. 1 shows such an IP packet in which a plurality of mini packets are multiplexed. According to FIG. 1, the variable length IP packet comprises an IP header having a length of 40 bytes as defined in the IP version 6. The IP header is followed by a UDP header with a length 8 bytes. The UDP header is followed by a mini packet length field of 1 byte which is used to indicate a common length of the following mini packets, in case they all have the same length. Moreover, the mini-packet length field can be used to indicate that the following mini packets have different lengths.

The header portion of the variable length IP packet and the mini packet length field are followed by a plurality of mini packets each comprising a respective mini header field of two or three bytes, respectively, and corresponding mini packets comprising $n_1, n_2 \ldots n_m$ bytes.

Since most of the mini packets tend to be of the same length in a usual transmission, one common length field is provided instead of a length field for every mini packet. Thereby, transmission overhead and bandwidth can be saved.

Figure 2:
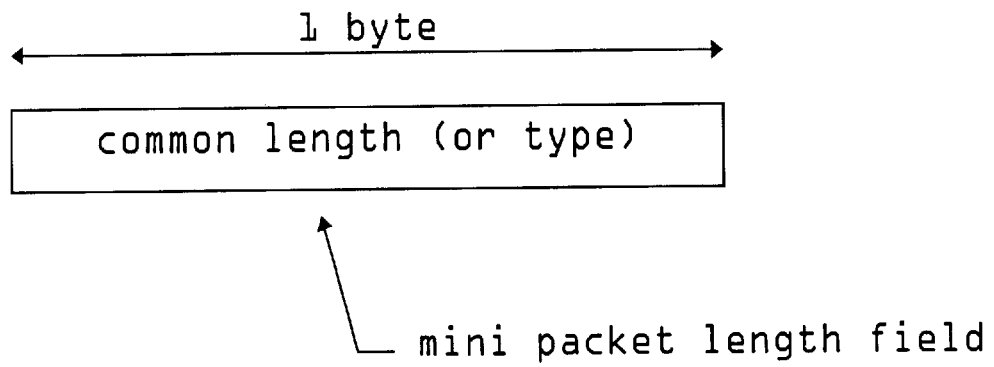
FIG. 2 shows a common length field provided in the IP data packet.

FIG. 2 shows a mini packet common length field as provided in the variable length IP data packet. According to FIG. 2, the common length field consists of one byte indicating the common length of every mini packet multiplexed inside the IP packet. The byte of this field may include an information as to a common type of mini packets, as long as the type unambiguously indicates the length of the mini packets. Whether a length or type information is used, can be agreed in signaling messages setting up the connection.

Additionally, a predetermined value such as 0 can be used so as to indicate that the mini packets included in the IP packet have individual lengths which differ from each other. However, in this case every mini packet header is increased from 2 bytes to 3 bytes, since the length of each mini packet has to be indicated in the corresponding mini packet header.

Figure 3:
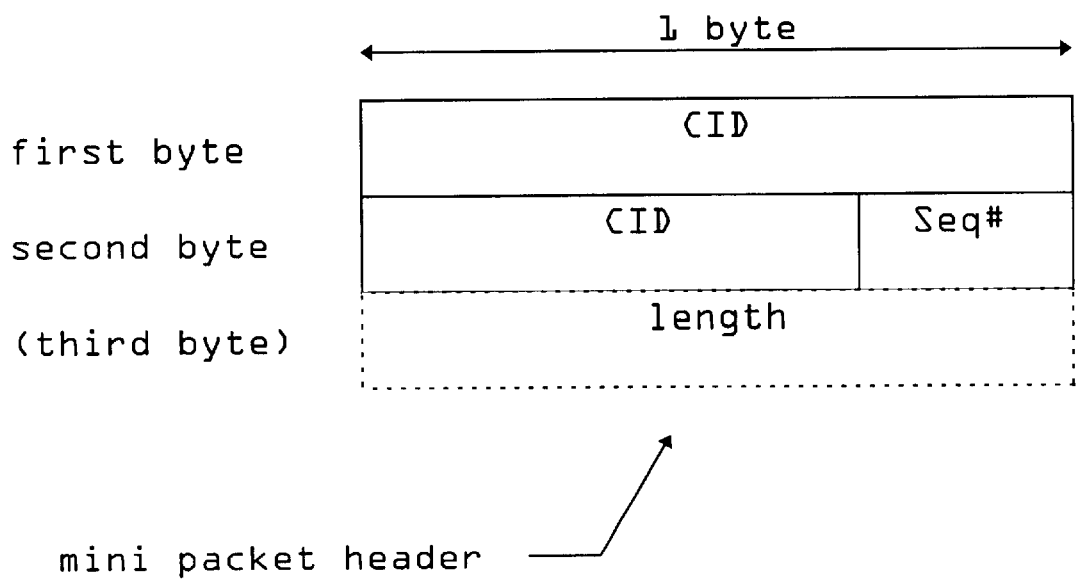
FIG. 3 shows a header structure of a mini packet.

FIG. 3 shows the structure of a mini packet header according to FIG. 1. The mini packet header consists of a first and a second byte and an optional third byte. In the first and the second byte, a connection identifier (CID) and a sequence number of the mini packet are included. A suitable length of the CID could be 14 bits which enables up to 16,384 different connections. Accordingly, two bits are left for the sequence number, since one byte consists of 8 bits. Thus, four different sequence numbers can be defined. The sequence number is provided in order to ensure that the transmitted information is not mixed up by a delayed IP packet. By means of this sequence number, a receiver of the IP packet is able to re-order delayed packets and detect lost packets.

The optional length field is used to indicate the length of the mini packet. This field is only required, when mini packets of different lengths are included in the variable length IP packet, i.e. when the common length indicated in the common length field is 0. Additionally, the mini packet specific length field of the mini packet header may be set to 0, in order to indicate that the remaining part of the IP packet-includes only this mini packet, i.e. the mini packet is the last data packet in the IP packet.

In view of the fact that the mini packets tend to have same lengths in usual transmission cases, a lot of IP packets will include mini packets of one length, which do not require individual length fields in their header portions. Thus, transmission overhead can be reduced.

The following two requirements should be met in order to ensure a tolerable overhead and delay: 1) the variable length IP packets have to include enough mini packets, i.e. some tens of data samples; and 2) the delay time until the receipt of those mini packets may not be too long.

The above requirements can be assured more efficiently by using different queues for each packet size and providing a timer so as to guarantee a reasonable maximum packing delay. These queues are filled up with received mini packets until a maximum size is reached or until the timer indicates the expiry of a predetermined delay time. The maximum size of the queues may correspond to the maximum size of an IP packet.

Thus, mini packets of different lengths or a reduced number of mini packets are multiplexed in order to ensure that the maximum delay time will not be exceeded. Nevertheless, the number of IP packets comprising mini packets of the same length can be increased by providing the above queues.

Figure 4:
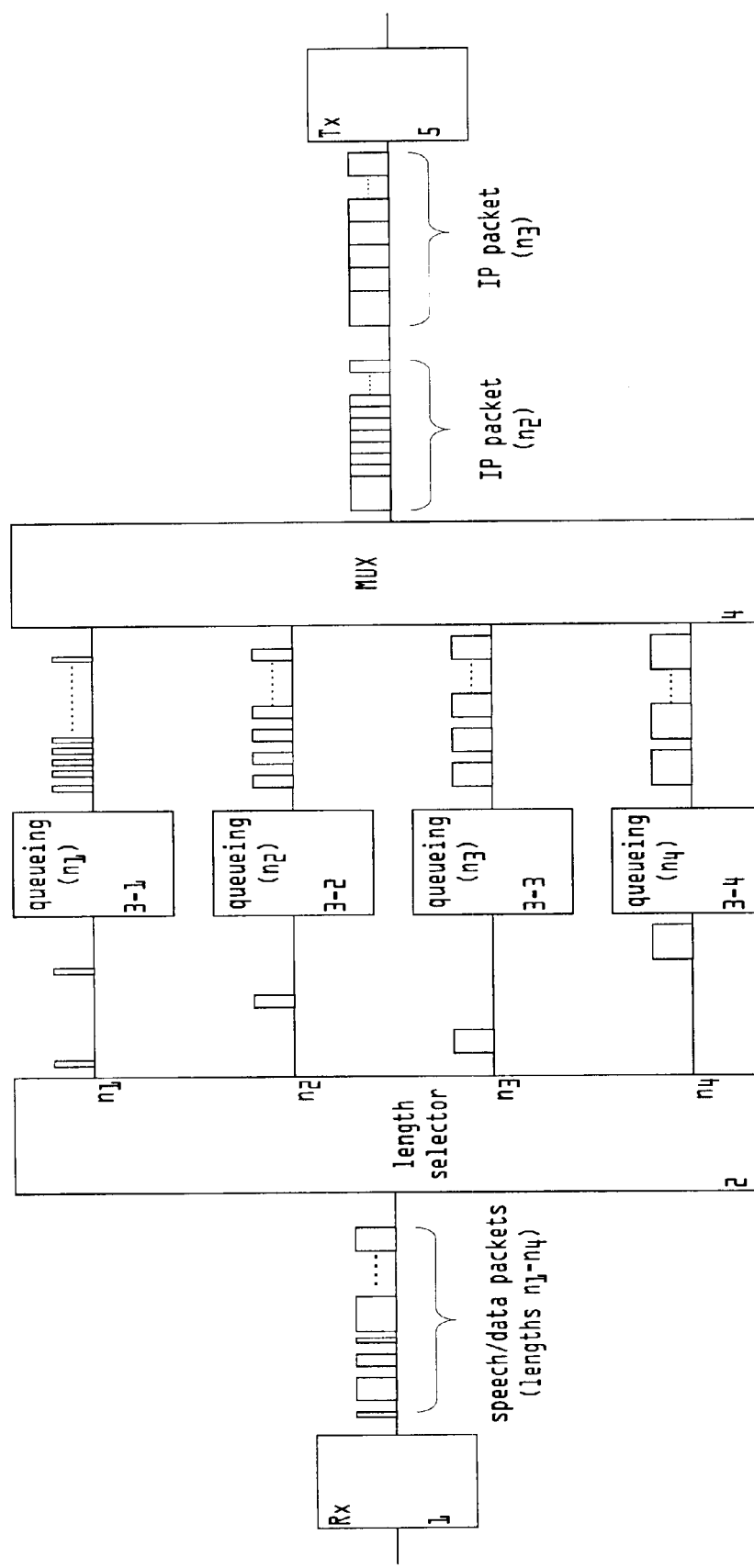
FIG. 4 shows a principle block diagram of a packet transmission apparatus according to an example of the preferred embodiment of the present invention.

FIG. 4 shows a packet transmission apparatus according to an example of the preferred embodiment of the present invention, wherein the above described queuing is performed so as to enhance transmission efficiency.

According to FIG. 4, four different queuing means 3-1 to 3-4 are provided for forming four different queues, i.e. one for each available mini packet size. Thus, the number of queues is selected in accordance with the total number of different mini packet lengths used in a mobile or cellular communication network from which the mini packets are received. Of course any other number of queuing means can be selected in accordance with the specifications of the source network of the mini packets.

Furthermore, a receiver (Rx) 1 is provided for receiving the mini packets (speech or data packets) from the cellular communication network. The received mini packets consist of an arbitrary series of lengths $n_1$–$n_4$ used in the cellular communication network. The arbitrary series of mini packets is supplied to a length selector 2 in which the mini packets are selected in accordance with their lengths, wherein each mini packet is provided at a corresponding one of four output terminals corresponding to the lengths $n_1$ to $n_4$.

Subsequently, the selected mini packets are supplied to the respective queuing means 3-1 to 3-4, where they are queued. The queuing means 3-1 to 3-4 may comprise shift registers or FIFO (First-In-First-Out) memories used to store a predetermined number of the mini packets.

The output terminals of the queuing means 3-1 to 3-4 are connected to a multiplexer 4 arranged to generate IP packets. The multiplexer 4 selects mini packets of one of the queuing means 3-1 to 3-4 to generate an IP packet comprising a predetermined number of mini packets of one length.

When a queue is filled up until the predetermined maximum size, the corresponding queuing means informs the multiplexer 4 of the filled state. Thus, the multiplexer 4 may use the mini packets of the filled queuing means for generating the next IP packet.

Moreover, a timer may be provided in the transmission apparatus, which counts a predetermined delay time since the start of filling of each of the queuing means 3-1 to 3-4. When the timer has reached the predetermined delay time, a corresponding signal is transmitted to the multiplexer 4, wherein the multiplexer 4 is arranged to generate an IP packet by using the mini packets stored in the delayed queuing means irrespective of the size of the queuing means. In this case, an IP packet comprising mini packets of different lengths or a reduced number of mini packets may be generated. In case mini packets of different lengths are transmitted in the IP packet, the multiplexer 4 is arranged to set the common length field of the IP packet to 0. In case one large mini packet is multiplexed as the last data packet in an IP packet, the multiplexer 4 is arranged to set the individual length field in the mini header of the mini packet to 0 in order to indicate that the large mini packet is the last data packet in the IP packet.

The mini headers of the mini packets in the IP packet are generated and added by the multiplexer 4 based on header portions of the mini packets received from the cellular communication network. Furthermore, the multiplexer 4 is arranged to set the mini packet common length field in accordance with the queuing means of the selected mini packets.

Finally, the variable length IP packets generated by the multiplexer 4 are supplied to a transmitter (Tx) 5 in order to be transmitted via the IP network.

It is to be noted that the length selector 2 and queuing means 3-1 to 3-4 described above not necessarily have to be provided in the transmission apparatus. As already mentioned, the transmission overhead can be reduced by providing the common length field in the IP packet, since the mini packets tend to have the same length.

Furthermore, the generation and/or setting of the respective header portions of the mini packets or the IP packet can be performed in any control means provided in the transmission apparatus.

In case the above preferred embodiment is used in a point-to-point link, the overhead benefit can be increased even more, since a header compression can be utilized in the IP network.

Moreover, the transmission apparatus and method according to the preferred embodiment enables the use of the IP for MSC-MSC and MSC-PSTN connections. In IP networks, the setup of ID values is easier and faster than with ATM and AAL2 (ATM Adaptation Layer Type 2), since intermediate nodes do not have to take part in signaling. In cellular networks, the rooting function can be provided by RR signaling which is needed anyway for the RR control.

In summary, a packet transmission method and apparatus are described, wherein short data samples or mini packets from several simultaneous connections are multiplexed to a variable length packet. The length of the mini packets is defined in a common length field for mini packets of the same length, which saves bandwidth. Each mini packet has its own header, which defines at least an identification information of the mini packet. Thus, the variable length packet, e.g. an IP packet, includes a plurality of mini packets with a minimum header portion, such that transmission overhead is reduced due to the fact that most mini packets tend to be of the same length. Moreover, different queues for mini packets of one respective length may be provided, from which mini packets of one length are multiplexed to the variable length data packet. Thereby, the ratio of variable length data packets including mini packets of one length is further increased so as to further decrease the transmission overhead.

The packet transmission method and apparatus is not restricted to the features described in the above preferred embodiment of the present invention. The description of the preferred embodiment and the accompanying drawings are only intended to illustrate the present invention. However, the embodiment of the present invention may vary within the scope of the attached claims.

What is claimed is:

1. A method for transmitting data packets via a telecommunication network, comprising the steps of:

multiplexing a plurality of data packets of several connections to a variable length data packet;

providing each of said plurality of data packets with a header portion defining at least an identification information of the respective data packet;

providing said variable length data packet with an information field indicating a common length of said plurality of data packets; and forming different queues each comprising data packets of one length, and using data packets of one of these queues for generating said variable length data packets.

2. A method according to claim 1, wherein said header portion of said data packets comprises a length field indicating the length of the respective data packet, in case said plurality of data packets have different lengths.

3. A method according to claim 1, further comprising the steps of forming different queues each comprising data packets of one length, and using data packets of one of these queues for generating said variable length data packets.

4. A method according to claim 1, wherein each of said queues is filled up until a predetermined maximum size has been reached or until a predetermined delay time has expired, before the data packets thereof are multiplexed.

5. A method according to claim 1, wherein said header portion of said data packet defines a sequence number of said data packet.

6. A method according to claim 1, wherein said information field defines a common type of said data packets, said common type indicating the length of said data packets.

7. A method according to claim 1, wherein a predetermined value of said information field is used to indicate that said data packets of said variable length data packet have different lengths.

8. A method according to claim 7 wherein said predetermined value of said length field is 0.

9. A method according to claim 1, wherein a predetermined value of said length field of the header portion of said data packet is used to indicate that said data packet is the last data packet in said variable length data packet.

10. A method according to claim 9, wherein said predetermined value of said length field is 0.

11. A method according to claim 1, wherein said data packets are speech data packets from a cellular communication network, and wherein said communication network is an IP network.

12. An apparatus for transmitting data packets via a communication network, comprising:
   multiplexing means for multiplexing a plurality of said data packets of several connections to a variable length data packet;
   header generating means for adding a header portion to each of said plurality of data packets, said header portion defining at least an identification information of the respective data packet;
   providing means for providing said variable length data packet with an information field indicating a common length of said plurality of data packets; and
   selecting means for selecting data packets according to their length, and queuing means for placing said selected data packets into respective queues comprising data packets of one respective length.

13. An apparatus according to claim 12, wherein said header generating means adds a length field indicating the length of the respective data packet to said header portion, in case said multiplexed plurality of data packets have different lengths.

14. An apparatus according to claim 12, further comprising selecting means (2) for selecting data packets according to their length, and queuing means (3-1 to 3-4) for placing said selected data packets into respective queues comprising data packets of one respective length.

15. An apparatus according to claim 12, wherein said multiplexing means is arranged to multiplex data packets of one of said queues, when a predetermined maximum size of said queue has been reached or when a timer provided for counting a delay time since the start of filling up said queue has reached a predetermined delay time.

16. An apparatus according claim 12, wherein said providing means is arranged to set said information field to a predetermined value, when the data packets included in said variable length data packet have different lengths.

17. An apparatus according to claim 16, wherein said predetermined value is 0.

18. An apparatus for transmitting data packets via a communication network, comprising:
   multiplexing means for multiplexing a plurality of said data packets of several connections to a variable length data packet;
   header generating means for adding a header portion to each of said plurality of data packets, said header portion defining at least an identification information of the respective data packet; and
   providing means for providing said variable length data packet with an information field indicating a common length of said plurality of data packets, wherein said header generating means sets said length field to a predetermined value, when said data packet is the last data packet in said variable length data packet.

19. An apparatus according to claim 18, wherein said predetermined value is 0.

20. An apparatus according to claim 12, wherein said data packets are speech data packets from a cellular communication network, and wherein said communication network is an IP network.

* * * * *